Nov. 19, 1963  H. GOLDBERG ETAL  3,110,998
LAWN MOWER RECEPTACLE SYSTEM FOR CLIPPINGS, LEAVES AND THE LIKE
Filed March 5, 1962  2 Sheets-Sheet 1

INVENTORS.
HARRY GOLDBERG
STANLEY Z. SIWEK
FRED FOSNACHT
BY Malcolm A. Bradway
Attorney.

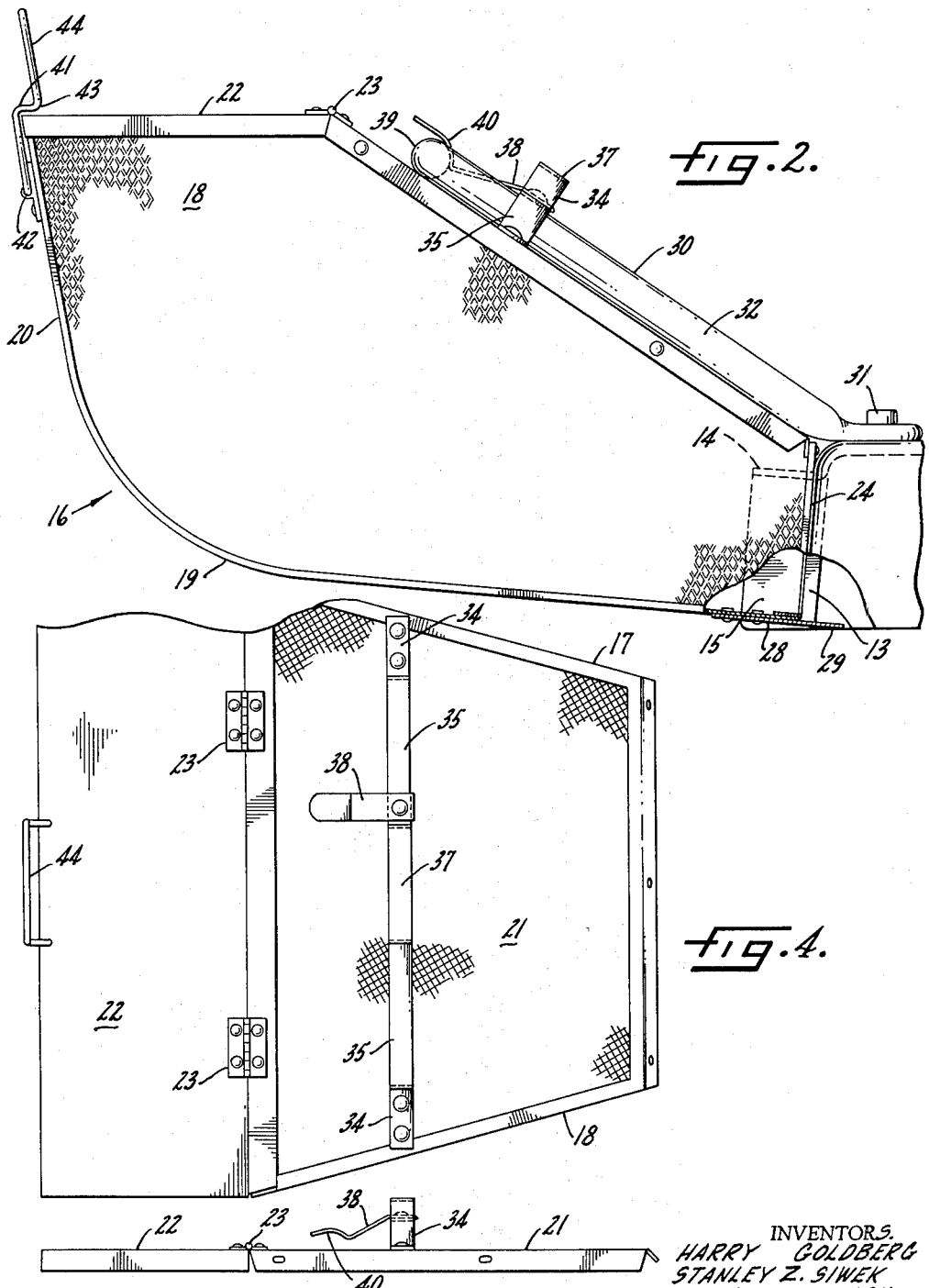

3,110,998
LAWN MOWER RECEPTACLE SYSTEM FOR CLIPPINGS, LEAVES AND THE LIKE
Harry Goldberg, River Forest, Stanley Z. Siwek, Chicago, and Fred Fosnacht, Berkeley, Ill., assignors to Pioneer Gen-E-Motor Corporation, Chicago, Ill.
Filed Mar. 5, 1962, Ser. No. 177,383
8 Claims. (Cl. 56—202)

This invention is directed to lawn mower receptacle systems and is particularly concerned with supporting means for receptacles that enable simple attachment to and detachment from a mower.

The major purposes of the invention are: to enable the user of a lawn mower receptacle system to attach and detach a receptacle for clippings through simple rectilinear movement of the receptacle, to provide simple and convenient means for detaching a receptacle from a mower base while allowing simple handling of a receptacle when removing it from a mower and at the same time providing a firm engagement between the mower base and receptacle in the operative, clipping receiving position of the receptacle.

One related purpose of the invention is to provide a simple means for locking and releasing a discharge opening gate for such a receptacle.

Another related purpose is to simplify manufacturing techniques for such receptacle system through simplification of attaching facilities for the receptacle.

Other purposes will appear from time to time in the course of the ensuing specification and claims when taken with the accompanying drawings, in which:

FIGURE 2 is an enlarged side elevation view of a portion of the system illustrated in FIGURE 1 and particularly illustrating receptacle mounting details;

FIGURE 4 is a top view of the receptacle illustrated in FIGURE 2;

FIGURE 5 is a side view of the top of the receptacle illustrated in FIGURE 4.

Like elements are designated by like characters throughout the specification and drawings.

Figure 3:
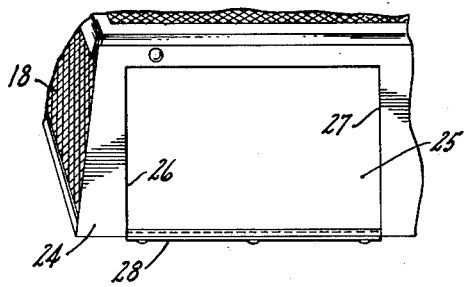
FIGURE 3 is a front view of the portion of the receptacle illustrated in FIGURE 2.
Figure 6:
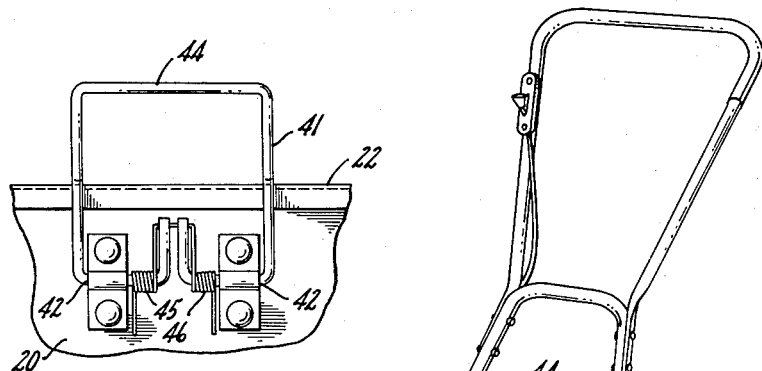
FIGURE 6 is an enlarged rear view of a portion of the receptacle illustrated in FIGURES 2 and 4 and particularly illustrating a latching assembly for the top of the receptacle.
Figure 1:
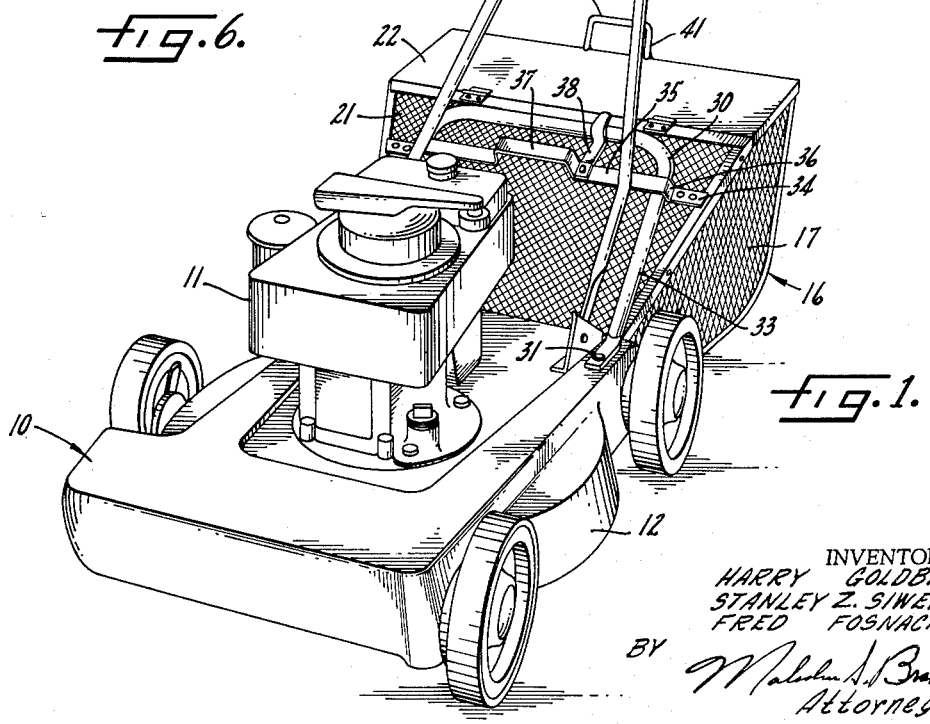
FIGURE 1 is a perspective view of a lawn mover system embodying the present invention.

With particular reference now to the drawings and in the first instance to FIGURE 1, the numeral 10 generally designates a wheel supported mower base, which as shown, is conventionally supplied with a motor 11 for driving a rotating cutting blade about a vertical axis and within the confines of a depending skirt 12 on the base. Mowers of this class are oftentimes supplied with discharge openings through the skirt so as to allow the expulsion of clippings, leaves or the like from the cutting area within the skirt. The mower base herein illustrated has such a discharge opening 13 on the rearwardly facing portion of the skirt. The discharge opening may be formed through a top plate 14 and side plates 15 which are integral with and extend rearwardly a short distance from the rear face of the skirt.

In accordance with the present invention, a receptacle 16 is supported from the rearward portion of the mower base, or that portion having the discharge opening. Receptacle 16 has foraminous side walls 17 and 18 which have an increasing area from the forward portion thereof to the rearward portion thereof. Receptacle 16 has an imperforate bottom wall 19, which, as is most clearly seen in FIGURE 2, extends from the front end of the receptacle to the rearward end thereof and which may have a curved portion extended upwardly to the top of the receptacle so as to also define a rear wall 20 of the receptacle. The top wall of the receptacle is defined by a foraminous forward portion 21, which is adapted to fit over and be secured to the inclined upper edges of the side walls 17 and 18, and a rearward gate portion 22 which is hinged to the forward portion as at 23. The rearward portion 22 is adapted to overlie and close a discharge opening from the receptacle and is adapted to fit snug against the rearward portions of the upper edges of the side walls 17 and 18.

The receptacle 16 also includes a front wall 24 which has a height generally corresponding to the height of the rearward portion of the mower skirt and a length corresponding to the length of the rearward portion of the mower skirt. This front wall 24 has an opening 25 formed therein. This opening is sized to correspond to the size of the discharge opening 13 from the mower base. The side edges 26 and 27 of this opening are spaced so that the rearwardly extending flanges defining the discharge opening may fit snugly thereagainst. A reinforcing plate 28 may extend across the bottom portion of this opening and may be extended forwardly slightly from the front wall 24 of the receptacle as appears at 29. This lip 29 may extend slightly within the confines of the mower skirt. The surfaces defining the opening 25 thus enclose the plates 14 and 15 defining opening 13.

In order to detachably support the receptacle on the base a U-shaped rod 30 has the end portions thereof fixed to the upper surface of the base as by bolts or the like 31. This rod 30 is inclined upwardly and outwardly from the mower base. The leg portions 32 and 33 of this rod converge slightly in a direction outwardly from the mower base.

A strap 34 is fixed to the wall 21 of the upper wall of the receptacle as by rivets or the like and includes a medial portion 35 which is spaced from the forward portion of the top wall generally in accordance with the thickness of the rod 30. Thus, the medial portion 35 of this strap together with the forward portion of the top wall 21 and the rod 30 define what are in effect interengageable channel means for slidably detaching the receptacle from and attaching the receptacle to a mower base. The spacing of the upwardly bent portions 36 of the strap corresponds generally to the spacing of the leg portions 32 and 33 of the rod, at that point of the legs of the rods which is the same distance from the skirt as is the strap from the front wall of the receptacle.

The central portion of the strap 35 may have a manipulating handle 37 formed thereon so that the user of the system may lift the receptacle by grasping this handle portion 37.

A spring arm 38 is adapted to extend between strap 35 at a point adjacent to handle 37 and the bight portion 39 of rod 30 so as to releasably secure the receptacle against retrograde movement on the rod 30. This spring arm is conveniently formed as a leaf spring having a curvilinear portion 40 which is adapted to abut against the bight portion 39 of the rod. The outer extremity of this leaf spring may be conveniently grasped by the fingers of the user so as to lift the same out of engagement with the bight portion 39 when the receptacle is to be removed from the mower base.

Top wall 22, which covers the discharge opening from the receptacle, is adapted to be held in closed position through a releasable locking handle 41. This locking handle 41 is pivoted to the rear wall of the receptacle as at 42. This handle is formed with a forwardly bent, projecting portion 43 which is adapted to overlie the rear edge of the top wall portion 22 and an upwardly extended portion 44 defining a handle for manipulation by the user of the system. Coil springs 45 and 46 bias the handle toward the closed or locking position.

In using the system, the user may conveniently attach the receptacle 16 to the mower base simply by sliding the strap 35 over the rod 30 until the front wall of the receptacle is snug against the rearward portion of the mower skirt. When this position is reached the spring arm 38 simply snaps into place and prevents retrograde movement of the receptacle from the base. The receptacle is thus securely held on the base. Side play of the receptacle is prevented by firm engagement between the strap 34 and the leg portions 32 and 33 of the rod as well as the engagement between the front wall of the receptacle and the rearward portion of the mower skirt, and engagement between the walls 15 for the discharge opening and the side walls 26 and 27 of the front wall of the receptacle.

The discharge gate 22 at the top of the receptacle is similarly snapped into locked position simply by forcing the gate downwardly, thus camming the handle portion outwardly against the bias of springs 45 and 46 until the top wall is in the closed position, at which time the forwardly bent portion 43 overlies the gate 22 and maintains it in position.

When the user desires to remove the receptacle from the base, he may easily do so by simply using one hand to lift the handle portion 44, while using the other hand to grasp the handle portion 37. By using the same hand grasping the handle portion 37, he may easily lift the spring arm 38 out of engagement with rod 30 and by this simultaneous support of the receptacle from the handles 44 and 37, slidably detach the receptacle from the base.

When he desires to discharge the contents of the receptacle, he simply pulls rearwardly on handle 44 to release the top wall portion 22 and inverts the receptacle to discharge the contents thereof.

The receptacle may then again be attached to the mower base as previously described.

The foraminous side walls of the receptacle and the front portion of the top wall aid in packing clippings and the like into the receptacle. In this connection, the greatest air flow discharge area when the receptacle is empty is in the rearward portion thereof. Thus, clippings are deposited in the rearward regions of the receptacle first. This filling proceeds from the rearward portion thereof to the front portion thereof until a substantial area of the foraminous side walls are covered by the clippings, which restricts air movement therethrough. The foraminous top wall portion is then the area of maximum air flow through the receptacle which allows the receptacle to be packed full and to a level flush against the forward portion of the top wall.

Whereas we have shown and described an operative form of the invention, it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claims.

We claim:

1. A lawn mower receptacle system for receiving clippings, leaves and the like including a wheel supported mower base having a depending skirt with a discharge opening formed therethrough, a guiding and supporting element positioned on said base and inclined upwardly and away from said base and above said discharge opening, said element having spaced surfaces converging slightly in a direction away from said mower base, a receptacle having a forward wall surface adapted to abut against said skirt, said receptacle having an inlet opening aligned with said discharge opening when said wall surface is abutted against said skirt, said receptacle having a recessed structure adapted to receive said guiding and supporting surfaces so that said receptacle may be moved toward and away from said mower base through sliding engagement between said surfaces and said recess, and releasable means for preventing retrograde movement of said receptacle when the forward wall surface of said receptacle abuts against said skirt.

2. A lawn mower receptacle system for clippings, leaves and the like, including a wheel supported mower base having a discharge opening leading from a cutting area within the base, a receptacle for clippings, leaves and other material having supporting means interengageable with supporting means on said base, said interengageable supporting means including a pair of spaced rods fixed to said base alongside said discharge opening, said rods being inclined upwardly and outwardly from said base, said rods converging in a direction away from said base, said receptacle having means defining channel like surfaces spaced to receive said rods therein, the spacing of said channel like surfaces being spaced in accordance with the spacing of said rods at a point adjacent said base, and releasable locking means extensible between said rods and said receptacle to hold said receptacle in a position snug against said base.

3. The structure of claim 2 wherein said receptacle includes a handle at the rearward portion thereof, and said locking means includes a member supported on said channel like surface means, said member being biased into a position wherein a rearward portion thereof abuts against a surface carried by said rods, said member having a manipulating portion on the rear portion thereof whereby the user may release said locking means and manipulate said receptacle by simultaneously supporting said receptacle from said handle and said manipulating portion.

4. A lawn mower receptacle system for clippings, leaves and the like including a wheel supported mower base having a downturned skirt with a discharge opening formed therethrough, a U-shaped rod having spaced legs fixed to said base, extending upwardly and outwardly from said base and straddling said opening, a receptacle having a front wall adapted for abutting relation to said skirt, said receptacle having a strap fixed to an upper wall thereof and spaced therefrom, said strap being spaced from said upper wall to define channel means therebetween adapted to slidingly receive said legs therein, one portion of said upper wall being hinged to the remainder thereof to define discharge means from said receptable, releasable means between the bight portion of said rod and said strap to hold said receptacle front wall snug against said skirt, and releasable means holding said one portion closed against said receptacle to close said discharge means.

5. The structure of claim 4 wherein said releasable means includes a leaf spring carried by said strap and having a surface abuttable against the bight portion of said rod.

6. The structure of claim 4 wherein said last named releasable means includes a handle extended above said one portion of said upper wall.

7. A lawn mower receptacle system for collecting leaves, clippings and the like including a wheel supported mower base having a discharge opening leading from a cutting area within said base, a supporting member fixed to said base and extending upwardly and outwardly from said discharge opening, a receptacle having means defining channels engageable with said member for slidable attachment to and detachment from said base, said receptacle having an inlet alignable with said discharge opening when said receptacle is attached to said base, said receptacle having a hinged top wall portion to allow discharge from said receptacle, and a plurality of releasable locking means for holding said top wall portion in a closed position and for locking said means to said member to hold said receptacle to said base, each said locking means being located on the rearward portion of said receptacle so as to enable simultaneous release of said locking means between said member and channel means and manipulation of said receptacle by support from said plural locking means.

8. The structure of claim 7 wherein said locking means for said hinged top wall includes a handle pivoted to a rearward portion of said receptacle and extended above said hinged top wall, said handle having a projection adapted to overlie said top wall and hold said top wall in closed position, said handle also including an outwardly inclined portion above said projection so that contact between said hinged top wall and inclined portion forces said handle outwardly from said top wall, and resilient means for forcing said handle inwardly toward locking position.

References Cited in the file of this patent

UNITED STATES PATENTS

| | | |
|---|---|---|
| 2,855,744 | Phelps | Oct. 14, 1958 |
| 2,955,404 | Strasel et al. | Oct. 11, 1960 |
| 2,959,904 | Ferris | Nov. 15, 1960 |
| 2,970,421 | Krewson | Feb. 7, 1961 |